United States Patent
Yoshinari et al.

(10) Patent No.: US 11,268,169 B2
(45) Date of Patent: Mar. 8, 2022

(54) NI-BASED SUPERALLOY CAST ARTICLE AND NI-BASED SUPERALLOY PRODUCT USING SAME

(71) Applicant: MITSUBISHI POWER, LTD., Kanagawa (JP)

(72) Inventors: Akira Yoshinari, Yokohama (JP); Yuting Wang, Yokohama (JP); Shigeru Tanaka, Yokohama (JP); Takeshi Izumi, Yokohama (JP)

(73) Assignee: MITSUBISHI POWER, LTD, Kanagawa (JP)

( * ) Notice: Subject to any disclaimer, the term of this patent is extended or adjusted under 35 U.S.C. 154(b) by 0 days.

(21) Appl. No.: 17/043,250

(22) PCT Filed: Apr. 2, 2018

(86) PCT No.: PCT/JP2018/014117
§ 371 (c)(1),
(2) Date: Sep. 29, 2020

(87) PCT Pub. No.: WO2019/193630
PCT Pub. Date: Oct. 10, 2019

(65) Prior Publication Data
US 2021/0025032 A1 Jan. 28, 2021

(51) Int. Cl.
*C22C 19/05* (2006.01)
*B22D 21/02* (2006.01)
*C22F 1/10* (2006.01)

(52) U.S. Cl.
CPC .......... *C22C 19/056* (2013.01); *B22D 21/025* (2013.01); *C22F 1/10* (2013.01)

(58) Field of Classification Search
CPC .................. C22C 19/056; C22F 1/10
See application file for complete search history.

(56) References Cited

U.S. PATENT DOCUMENTS 4,629,521 A 12/1986 Maurer et al.
6,231,692 B1 5/2001 Vogt et al.
(Continued)

FOREIGN PATENT DOCUMENTS

JP 2003-013161 A 1/2003
JP 2004-197131 A 7/2004
(Continued)

OTHER PUBLICATIONS

PCT/JP2018/014117 International Search Report, dated Jul. 3, 2018, 2 pgs.
(Continued)

*Primary Examiner* — Jessee R Roe
(74) *Attorney, Agent, or Firm* — Volpe Koenig

(57) ABSTRACT

It is an objective of the invention to provide a Ni-based superalloy cast article exhibiting the corrosion resistance compatible or superior to the conventional ordinary precision cast articles and reducing the cost than the conventional ones while maintaining the mechanical properties compatible to the conventional ones. There is provided a Ni-based superalloy cast article including: 12.1 to 16 mass % of Cr; 4 to 16 mass % of Co; 3 to 5 mass % of Al; 2.1 to 3.3 mass % of Ti; 3.5 to 9 mass % of W; 1 to 2.4 mass % of Mo; 1.2 mass % or less of Nb; 0.005 to 0.05 mass % of B; 0.03 to 0.2 mass % of C; more than 0 mass % and 0.005 mass % or less of O; and the balance being Ni and impurities.

6 Claims, 1 Drawing Sheet

110 BLADE PORTION
121 PLATFORM
122 RADIAL FIN
120 SHANK PORTION
130 ROOT PORTION

(56) References Cited

U.S. PATENT DOCUMENTS

| | | |
|---|---|---|
| 2004/0177901 A1 | 9/2004 | Yoshinari et al. |
| 2009/0000706 A1 | 1/2009 | Huron et al. |
| 2010/0329876 A1 | 12/2010 | Bain et al. |
| 2011/0062220 A1 | 3/2011 | Feng et al. |
| 2012/0328429 A1 | 12/2012 | Wang et al. |
| 2015/0247422 A1 | 9/2015 | Feng et al. |

FOREIGN PATENT DOCUMENTS

| | | |
|---|---|---|
| JP | 2013-199680 A | 10/2013 |
| JP | 2015-165046 A | 9/2015 |
| WO | 00-44949 A1 | 8/2000 |

OTHER PUBLICATIONS

Extended European Search Report dated Sep. 21, 2021 for European Patent Application No. 18913750.8.

- 110 BLADE PORTION
- 121 PLATFORM
- 122 RADIAL FIN
- 120 SHANK PORTION
- 130 ROOT PORTION

- 210 INNER RING SIDE END WALL
- 220 BLADE PORTION
- 230 OUTER RING SIDE END WALL

ND-BASED SUPERALLOY CAST ARTICLE AND NI-BASED SUPERALLOY PRODUCT USING SAME

TECHNICAL FIELD OF THE INVENTION

The present invention relates to a technology of Ni (nickel) based superalloy articles, in particular, to an Ni-based superalloy casting article and a product using the Ni-based superalloy cast article which are excellent in mechanical properties and corrosion resistance at high temperatures and can be manufactured at low cost.

DESCRIPTION OF RELATED ART

Increasing temperatures of the primary fluid of turbine has been one of the technical trend with the aim of improve thermal efficiency in aircraft turbines and turbines of thermal power plants (gas turbines, steam turbines). It is very important for turbine high-temperature members (e.g., turbine blades such as rotor blades and stator blades, turbine disks, combustor members, boiler members) exposed to a very severe operating environment due to an increase in the primary fluid temperature to have excellent mechanical properties (e.g., creep properties, tensile properties, fatigue properties). This is because the turbine high-temperature members are repeatedly subjected to the rotational centrifugal stress during operation and/or the thermal stress associated with vibration and start/stop.

Concurrently, it is also very important that the turbine high-temperature members have excellent corrosion resistance (including oxidation resistance) in order to withstand the primary fluid heated to a high temperature. In order to satisfy various mechanical properties and corrosion resistance required for the turbine high temperature members, a Ni-based superalloy material is currently widely used as a material thereof.

In a turbine high-temperature member, a precision casting method is generally utilized for manufacturing a member having a complicated shape (e.g., a turbine blade) from the viewpoint of shape controllability and manufacturing cost. The precision casting articles include an ordinary precision cast article having a metallographic structure composed of equiaxed crystals, a unidirectionally solidified article having a metallographic structure composed of columnar crystals aligned in the long axis direction, and a single crystal solidified article having a metallographic structure composed of one crystal through the entire article.

Both the unidirectionally solidified article and the single crystal solidified article are advantageous in the viewpoint of creep characteristics since weakening factors such as grain boundaries dividing the longitudinal direction of the article are excluded. However, the directionally solidified article and the single crystal solidified article have weak points in terms of manufacturing cost (e.g., manufacturing yield, time required for manufacturing). In contrast, the ordinary precision cast article is advantageous from the viewpoint of manufacturing cost and corrosion resistance, but has a weak point from the viewpoint of creep characteristics. Therefore, various researches and developments have been carried out to improve mechanical properties such as creep properties while maintaining the advantages of ordinary precision cast articles.

For example, Patent Literature 1 (JP 2003-013161 A) discloses that an austenitic low thermal expansion Ni-based superalloy comprising: 0.15 mass % or less of C (carbon), 1 mass % or less of Si (silicon), 1 mass % or less of Mn (manganese), 5 mass % or more and 20 mass % or less of Cr (chromium), 17 mass % or more and 26 mass % or less of Mo (molybdenum), 0.1 mass % or more and 2.0 mass % or less of Al (aluminum), 0.1 mass % or more and 2.0 mass % or less of Ti (titanium), 10 mass % or less of Fe (iron), 0.02 mass % or less of B (boron), 0.2 mass % or less of Zr (zirconium), Nb (niobium), Ta (tantalum), W (tungsten) and Re (rhenium), and the balance being substantially Ni (nickel), wherein the total contents of Al, Ti, Nb and Ta is 1 mass % or more and 5.5 mass % or less, wherein the formula "17≤Mo+(W+Re)/2≤27" is satisfied (herein, Mo: molybdenum content, mass %; W: tungsten content, mass %; and Re: rhenium content, mass %), wherein the formula "Nb+Ta/2≤1.5" is satisfied (herein, Nb: niobium content, mass %; and Ta: tantalum content, mass %), and wherein γ' phase composed of an intermetallic compound $Ni_3Al$, $Ni_3(Al,Nb,Ta)$ or $Ni_3(Al,Ti)$ and $A_2B$ phase composed of an intermetallic compound $Ni_2(Mo,Cr)$ are co-precipitated.

Furthermore, Patent Literature 2 (JP 2004-197131 A) discloses that a heat resistant Ni-based superalloy comprising in weight %: Cr of 12.0 to 16.0, Co of 4.0 to 9.0, Al of 3.4 to 4.6, Nb of 0.5 to 1.6, C of 0.05 to 0.16, B of 0.005 to 0.025, Hf of 0 to 2.0, Re of 0 to 0.5, Zr of 0 to 0.05, O of 0 to 0.005, N of 0 to 0.005, Si of 0 to 0.01, Mn of 0 to 0.2, P of 0 to 0.01, S of 0 to 0.01, and at least one of the elements Ti, Ta and Mo, with
4.0≤TiEq≤6.0, TiEq=Ti+0.5153 Nb+0.2647 Ta,
5.0≤MoEq≤8.0, MoEq=Mo+0.5217 W+0.5303 Ta+1.0326 Nb, wherein γ' phase is precipitated in a matrix of the superalloy.

CITATION LIST

Patent Literature

Patent Literature 1: JP 2003-013161 A, and
Patent Literature 2: JP 2004-197131 A.

SUMMARY OF THE INVENTION

Problems to be Solved by the Invention

According to Patent Literature 1, there would be provided an austenitic low thermal expansion Ni-based superalloy exhibiting the high-temperature strength and the corrosion resistance/oxidation resistance comparable to an austenitic heat resistant alloy. According to Patent Literature 2, there would be provided a heat resistant Ni-based superalloy exhibiting superior high-temperature creep rapture strength, oxidation resistance and corrosion resistance, and being useful for the ordinary casting or the unidirectionally solidification.

As described before, it is an indispensable task to secure the mechanical characteristics and the corrosion resistance of the turbine high-temperature members so as to being capable of withstanding the high temperature of primary fluid.

On the other hand, naturally there is a strong demand for cost reduction for industrial products, and establishment of a technique for providing products at low cost is one of the most important issues. From the viewpoint of cost reduction, it is clear that a Ni-based superalloy suitably used for the ordinary precision casting is preferable not to intentionally contain expensive elements (e.g., Re, Hf and Ta) as its components.

Further, if the turbine high-temperature member can secure high corrosion resistance that can withstand use of a fuel with a relatively low purification degree (fuel containing a relatively large amount of impurities), a subsidiary effect reducing the operational cost (e.g. fuel cost) of the turbine would also be expected by means of using the turbine high-temperature member.

The present invention has been made in view of the forgoing. It is an objective of the invention to provide a Ni-based superalloy cast article exhibiting the corrosion resistance compatible or superior to the conventional ordinary precision cast articles and reducing the cost than the conventional ones while maintaining the mechanical properties compatible to the conventional ones. Another objective is to provide a product using the Ni-based superalloy cast article of the invention.

Solution to Problems (I) According to one aspect of the present invention, there is provided a Ni-based superalloy cast article having a chemical composition that includes:
12.1 mass % or more and 16 mass % or less of Cr;
4 mass % or more and 16 mass % or less of Co;
3 mass % or more and 5 mass % or less of Al;
2.1 mass % or more and 3.3 mass % or less of Ti;
3.5 mass % or more and 9 mass % or less of W;
1 mass % or more and 2.4 mass % or less of Mo;
1.2 mass % or less of Nb;
0.005 mass % or more and 0.05 mass % or less of B;
0.03 mass % or more and 0.2 mass % or less of C;
more than 0 mass % and 0.005 mass % or less of O; and
the balance being Ni and impurities.

In the above aspect (I) of the invention, the following modifications and changes can be made.

i) The impurities may include: 0.1 mass % or less of Ta; 0.05 mass % or less of Hf; 0.05 mass % or less of Re; 0.01 mass % or less of Zr; 0.005 mass % or less of N; 0.01 mass % or less of P; and 0.01 mass % or less of S.

ii) The chemical composition may include: the Cr of 13.1 mass % or more and 16 mass % or less; the Co of 5.1 mass % or more and 15 mass % or less; the Al of 3.6 mass % or more and 5 mass % or less; the Ti of 2.2 mass % or more and 3.3 mass % or less; the W of 4.5 mass % or more and 9 mass % or less; the Mo of 1.4 mass % or more and 2.4 mass % or less; the Nb of 0.5 mass % or less; the B of 0.01 mass % or more and 0.03 mass % or less; the C of 0.05 mass % or more and 0.15 mass % or less; and the O of 0.001 mass % or more and 0.005 mass % or less.

iii) The chemical composition may include: the Cr of 13.1 mass % or more and 14.5 mass % or less; the Co of 6 mass % or more and 12 mass % or less; the Al of 3.8 mass % or more and 4.8 mass % or less; the Ti of 2.3 mass % or more and 3.3 mass % or less; the W of 5 mass % or more and 9 mass % or less; the Mo of 1.8 mass % or more and 2.4 mass % or less; the Nb of 0.1 mass % or less; the B of 0.01 mass % or more and 0.02 mass % or less; the C of 0.05 mass % or more and 0.12 mass % or less; and the O of 0.001 mass % or more and 0.004 mass % or less.

(II) According to another aspect of the present invention, there is provided a Ni-based superalloy product that uses the above-described Ni-based superalloy cast article. The cast article has a metallographic structure composed of equiaxed crystals or composed of columnar crystals aligned in the long axis direction.

In the above aspect (II) of the invention, the following modifications and changes can be made.

iv) The product may be a turbine high-temperature member.

v) The turbine high-temperature member may be a turbine blade.

Advantages of the Invention

According to the present invention, it is possible to provide a Ni-based superalloy cast article exhibiting the corrosion resistance compatible or superior to the conventional ordinary precision cast articles and reducing the cost than the conventional ones while maintaining the mechanical properties compatible to the conventional ones. Also possible is to provide a product using the Ni-based superalloy cast article of the invention.

Figure 1:
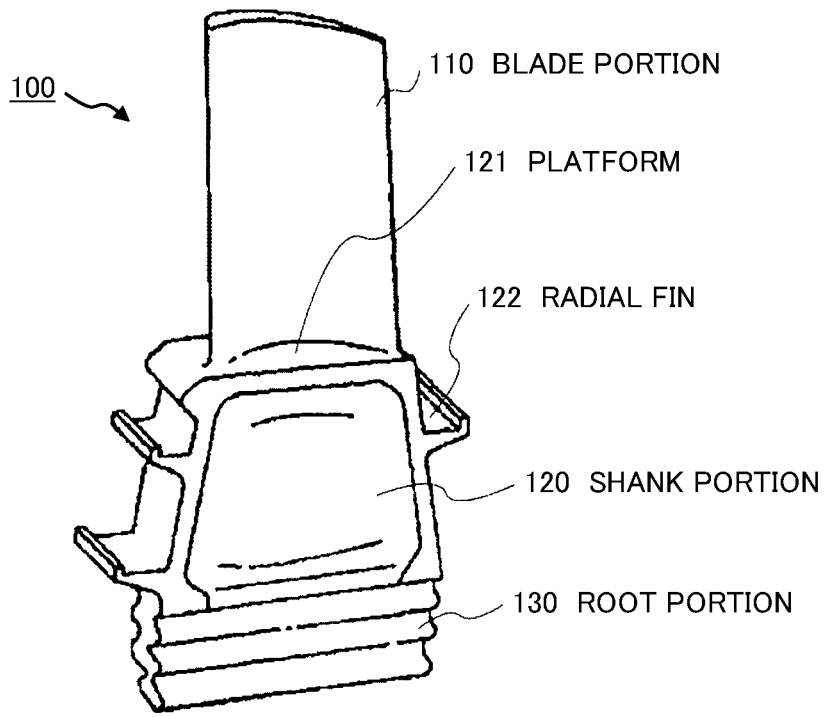
FIG. 1 is a schematic illustration showing a perspective view of a turbine rotor blade as an example of a Ni-based superalloy product according to the invention.

DETAILED DESCRIPTION OF THE PREFERRED EMBODIMENTS (Basic Idea of Present Invention)

As mentioned before, the invention is directed to a polycrystalline cast article made of a Ni-based superalloy that can be suitably used as a Ni-based superalloy product such as a turbine high-temperature member. In particular, an objective thereof is to provide a Ni-based superalloy cast article exhibiting the corrosion resistance (including oxidation resistance) compatible or superior to the conventional ordinary precision cast articles and reducing the cost than the conventional ones while maintaining the mechanical properties compatible to the conventional ones. Then, in order to achieve the objective, the inventors have studied the component balance (i.e. alloy composition) of the Ni-based superalloy in detail.

In the general, the inventors planned to refrain from intentionally adding expensive elements (e.g., Re, Hf, Ta) in order to achieve the cost reduction. Here, inevitable mixing those elements into the alloy from raw materials is allowed. However, since those elements are components that have been considered/required in the prior art to improve mechanical properties at high temperatures, there is a concern that mechanical properties may deteriorate.

Therefore, in order to achieve the desired mechanical properties, optimization of the W and Mo contents, which are considered to have the effect of solid solution strengthening, was investigated. Furthermore, in order to achieve the desired corrosion resistance, optimization of the Ti and Mo contents was investigated. In other words, as compared with the prior art, instead of intentionally not containing expensive elements such as Re, Hf and Ta, the inventors have earnestly studied optimization of the W, Mo and Ti contents.

As a result, it has been found that a polycrystalline cast article that achieves the above objective can be obtained by using a Ni-based superalloy having a chemical composition (also referred to as an alloy composition) defined in this specification. The present invention has been made based on this new finding.

Preferred embodiments of the invention will be described below with reference to the accompanying drawings. However, the invention is not limited to the specific embodiments described below, but various combinations and modifications are possible without departing from the spirit and scope of the invention.

[Ni-Based Superalloy Cast Article]

(Chemical Compositions of Nickel-Based Superalloy)

Compositions (each component) of the Ni-based superalloy to be used in the invention will be described below.

Cr: 12.1 to 16 Mass %

The Cr component exhibits effects of improving the mechanical properties (e.g., creep strength) by dissolving itself into the γ phase as a solid solution and improving the corrosion resistance (in particular, molten salt corrosion resistance) by forming an oxide film (e.g., $Cr_2O_3$) on the surface of the superalloy cast article. The Cr content should be preferably 12.1 mass % or more and 16 mass % or less, more preferably 13.1 mass % or more and 16 mass % or less, and even more preferably 13.1 mass % or more and 14.5 mass % or less.

When the Cr content is less than 12.1 mass %, the above-mentioned positive effects cannot be obtained sufficiently. In contrast, when the Cr content is more than 16 mass %, the topological close-packed phase (TCP phase such as σ phase and μ phase) of an embrittlement phase is prone to precipitate, resulting in a large decrease in the mechanical properties and the corrosion resistance; and the solid-soluble amount of other solid solution strengthening elements (such as W and Mo) decreases, thereby degrading the solid solution strengthening effect.

Co: 4 to 16 Mass %

The Co component is a similar element to the Ni and exhibits effects of improving the mechanical properties (e.g., creep strength) by substituting with Ni to form a solid solution in the γ phase and of improving the corrosion resistance. The Co content should be preferably 4 mass % or more and 16 mass % or less, more preferably 5.1 mass % or more and 15 mass % or less, and even more preferably 6 mass % or more and 12 mass % or less.

When the Co content is less than 4 mass %, the above-mentioned positive effects cannot be obtained sufficiently. In contrast, when the Co content is more than 16 mass %, precipitation of the γ' phase ($L1_2$ type Ni-based intermetallic compound phase), which is a mechanical strengthening factor at high temperatures, is prone to be suppressed, and the mechanical properties (e.g., creep strength) are degraded.

Al: 3 to 5 Mass %

The Al component is an essential constituent to form the γ' phase (e.g., $Ni_3Al$ phase). Also, the Al component has an effect of improving the corrosion resistance (including oxidation resistance) by forming an oxide film (for example, $Al_2O_3$) on the surface of the superalloy cast article. The Al content should be preferably 3 mass % or more and 5 mass % or less, more preferably 3.6 mass % or more and 5 mass % or less, and even more preferably 3.8 mass % or more and 4.8 mass % or less.

When the Al content is less than 3 mass %, the above-mentioned positive effects cannot be obtained sufficiently. In contrast, when the Al content is more than 5 mass %, crystal grains of the eutectic γ' phase, which is another phase different in morphology from the γ' phase precipitated by the solution-aging treatment, are likely to generate and grow during solidification of casting. Coarse eutectic γ' phase grains are prone to be a starting point of cracks in the creep phenomenon, and thus the mechanical properties (e.g., creep strength) deteriorate. Furthermore, if a complex oxide with another metal component (e.g. Cr) is formed, the corrosion resistance becomes lower.

Ti: 2.1 to 3.3 Mass %

The Ti component forms a γ' phase (e.g., $Ni_3(Al,Ti)$ phase) together with the Al component, and has an effect of improving the mechanical properties (e.g., creep strength). Furthermore, the Ti component has another effect of significantly improving the corrosion resistance of the Ni-based alloy at high temperatures (e.g., corrosion resistance against molten salt corrosion). The Ti content should be preferably 2.1 mass % or more and 3.3 mass % or less, more preferably 2.2 mass % or more and 3.3 mass % or less, and even more preferably 2.3 mass % or more and 3.3 mass % or less.

When the Ti content is less than 2.1 mass %, the above-mentioned positive effects cannot be obtained sufficiently. In contrast, when the Ti content is more than 3.3 mass %, the oxidation resistance of the Ni-based superalloy becomes degraded, and the η phase ($D0_{24}$ type Ni-based intermetallic compound phase, e.g. $Ni_3Ti$ phase) of an embrittlement phase is prone to precipitate, decreasing the mechanical properties (e.g., creep strength).

W: 3.5 to 9 Mass %

The W component exhibits an effect of solid solution strengthening by dissolving itself into the γ phase and the γ' phase. The W content should be preferably 3.5 mass % or more and 9 mass % or less, more preferably 4.5 mass % or more and 9 mass % or less, and even more preferably 5 mass % or more and 9 mass % or less.

When the W content is less than 3.5 mass %, the above-mentioned positive effect cannot be obtained sufficiently. In contrast, when the W content is more than 9 mass %, the mechanical properties and the corrosion resistance are deteriorated by easily generating needle-shaped precipitates containing W as a main component (e.g., α-tungsten oxide).

Mo: 1 to 2.4 Mass %

The Mo component exhibits effects of increasing the solvus temperature of the γ' phase and solid solution strengthening similar to the W component. Since the Mo has a smaller specific gravity than the W, there is also an advantage of suppressing the weighting of the superalloy cast article by replacing the W with the Mo. In addition, the Mo component has another effect of improving corrosion resistance like the Cr component. The Mo content should be preferably 1 mass % or more and 2.4 mass % or less, more preferably 1.4 mass % or more and 2.4 mass % or less, and even more preferably 1.8 mass % or more and 2.4 mass % or less.

When the Mo content is less than 1 mass %, the above-mentioned positive effects cannot be obtained sufficiently. In contrast, when the Mo content is more than 2.4 mass %, the corrosion resistance (in particular, oxidation resistance) is rather degraded.

Nb: 1.2 Mass % or Less

The Nb component forms a γ' phase (e.g., $Ni_3(Al,Nb,Ti)$ phase) together with the Al and Ti components, and has an effect of improving the mechanical properties (e.g., creep strength). Furthermore, the Nb component has another effect of slightly improving the high-temperature corrosion resistance. In superalloy cast articles of the invention, however, the Nb is not an essential component. When containing Nb component, the Nb content should be preferably 1.2 mass % or less, more preferably 0.5 mass % or less, and even more preferably 0.1 mass % or less.

Because the Nb component is not an essential constituent, there is no particular problem even if it is not contained. In contrast, when the Nb content is more than 1.2 mass %, the η phase of an embrittlement phase is prone to precipitate, decreasing the mechanical properties (e.g., creep strength).

B: 0.005 to 0.05 Mass %

The B component exhibits an effect of enhancing the grain boundary strength by segregating at the crystal grain boundaries of the γ phase. In order to balance the creep strength and the grain boundary strength, the B content should be preferably 0.005 mass % or more and 0.05 mass % or less, more preferably 0.01 mass % or more and 0.03 mass % or less, and even more preferably 0.01 mass % or more and 0.02 mass % or less.

When the B content is less than 0.005 mass %, the above-mentioned positive effect cannot be obtained sufficiently. In contrast, when the B content is more than 0.05 mass %, excessive amount of borides generate and the solidus temperature (so-called melting temperature) of this superalloy largely lowers, thereby significantly degrading the creep strength.

C: 0.03 to 0.2 Mass %

The C component is also an important constituent for enhancing both the creep strength and the grain boundary strength, and has an effect of improving the grain boundary strength by segregating at the crystal grain boundaries of the γ phase. In order to balance the creep strength and the grain boundary strength, the C content should be preferably 0.03 mass % or more and 0.2 mass % or less, more preferably 0.05 mass % or more and 0.15 mass % or less, and even more preferably 0.05 mass % or more and 0.12 mass % or less.

When the C content is less than 0.03 mass %, the above-mentioned positive effect cannot be obtained sufficiently. In contrast, when the C content is more than 0.2 mass %, excessive amount of carbides are formed and the mechanical properties (e.g., creep strength and ductility) deteriorate, and the corrosion resistance also decreases.

O: More than 0 Mass % and 0.005 Mass % or Less

The O component is an essential constituent to form the oxide film (e.g., $Cr_2O_3$ and $Al_2O_3$) contributing to improvement of the corrosion resistance. However, the O component is also an impurity that deteriorates the mechanical properties (e.g., creep strength and ductility) of the superalloy cast article when coarse particles of the oxides are formed. By controlling the O content to be 0.005 mass % or less, the negative influence can be suppressed. The O content should be preferably more than 0 mass % and 0.005 mass % or less, more preferably 0.001 mass % or more and 0.005 mass % or less, and even more preferably 0.001 mass % or more and 0.004 mass % or less.

Balance: Ni Component and Impurities

The Ni component is the main component (component of maximum content), as a result of the balance with the various components described above, the Ni content should be preferably 51 mass % or more and 74 mass % or less, and more preferably 55 mass % or more and 70 mass %.

The impurities of superalloy article in the invention do not mean components that are intentionally added and contained, but means components that the content of which is desired to be reduced. The impurities include, e.g., Ta, Hf, Re, Zr, N, P, and S. 0.1 mass % or less of Ta, 0.05 mass % or less of Hf, 0.05 mass % or less of Re, 0.01 mass % or less of Zr, 0.005 mass % or less of N, 0.01 mass % or less of P, and 0.01 mass % or less of S are within the acceptable contamination range.

Ta: 0.1 Mass % or Less

The Ta component forms a γ' phase (e.g., $Ni_3$(Al,Ta,Ti) phase) together with the Al and Ti components, and has an effect of improving the mechanical properties (e.g., creep strength). In the invention, however, the Ta component is treated as an impurity as described above, avoiding use of an expensive raw material (not intentionally adding such raw material) in order to reduce the cost of the superalloy cast article. In other words, it is preferable that the Ta component is not substantially contained.

Meanwhile, in the invention it should be noted that resultant Ta content mixed from the raw materials of other components and during the manufacturing processes (e.g., from crucible and mold) is not denied. For example, the Ta content is preferably 0.1 mass % or less, and more preferably 0.05 mass % or less.

Hf: 0.05 Mass % or Less

The Hf component has an effect of improving the corrosion resistance at high temperatures by improving adhesion of the oxide films (e.g., $Cr_2O_3$ and $Al_2O_3$) formed on a surface of the superalloy cast article. In the invention, however, the Hf component is treated as an impurity as described above, avoiding use of an expensive raw material (not intentionally adding such raw material) in order to reduce the cost of the superalloy cast article. In other words, it is preferable that the Hf component is not substantially contained.

In the invention it should be noted that resultant Hf content mixed from the raw materials of other components and during the manufacturing processes (e.g., from crucible and mold) is not denied. For example, the Hf content is preferably 0.05 mass % or less, and more preferably 0.01 mass % or less.

Re: 0.05 Mass % or Less

The Re component, as is the case with the W component, has effects of solid-solution strengthening the γ phase and improving the corrosion resistance. In the invention, however, the Re component is treated as an impurity as described above, avoiding use of an expensive raw material (not intentionally adding such raw material) in order to reduce the cost of the superalloy cast article. In other words, it is preferable that the Re component is not substantially contained.

In the invention it should be noted that resultant Re content mixed from the raw materials of other components and during the manufacturing processes (e.g., from crucible and mold) is not denied. For example, the Re content is preferably 0.05 mass % or less, and more preferably 0.01 mass % or less.

Zr: 0.01 Mass % or Less

The Zr component has effects of enhancing the crystal grain boundary strength by segregating to the crystal grain boundaries of the γ phase with very small amount addition. On the other hand, the Zr component is an impurity with large demerits in that a Ni-based intermetallic compound phase (e.g., $Ni_3Zr$ phase) is prone to be generated and the mechanical properties are degraded by decreasing the solidus temperature (so-called melting temperature) of the superalloy. By controlling the Zr content to be 0.01 mass % or less, the negative influence can be suppressed. The Zr content is more preferably 0.005 mass % or less.

N: 0.005 Mass % or Less

The N component has an effect of improving the mechanical properties (e.g., hardness) with very small amount addition by combining other components of the superalloy and forming fine particles of nitrides (e.g., Cr nitride and Al nitride). On the other hand, when coarse particles of the nitrides are formed, the N component is an impurity degrading the mechanical properties (e.g., creep strength and ductility) of the superalloy cast article. By controlling the N content to be 0.005 mass % or less, the negative influence can be suppressed. The N content is more preferably 0.004 mass % or less.

P: 0.01 Mass % or Less

The P component is an impurity that is prone to segregate to the crystal grain boundaries of the γ phase and decrease the corrosion resistance of the crystal grain boundaries and the mechanical properties. By controlling the P content to be 0.01 mass % or less, the negative influences can be suppressed. The P content is more preferably 0.008 mass % or less, and even more preferably 0.005 mass % or less.

S: 0.01 Mass % or Less

The S component is an impurity that is prone to form a sulfide having a relatively low melting point by combining with other components of the superalloy and decreases the mechanical properties of the superalloy cast article. By controlling the S content to be 0.01 mass % or less, the negative influences can be suppressed. The S content is more preferably 0.008 mass % or less, and even more preferably 0.005 mass % or less.

[Product Using Ni-Based Superalloy Cast Article]

As described before, the Ni-based superalloy cast article of the invention has an alloy composition in that expensive elements such as Ta, Hf and Re are not intentionally added in order to realize cost reduction and the contents of W, Mo and Ti are optimized in order to achieve desirable mechanical properties and desirable corrosion resistance.

Furthermore, as types of cast article, an ordinary precision cast article having a metallographic structure composed of equiaxed crystals and a unidirectionally solidified article having a metallographic structure composed of columnar crystals aligned in the long axis direction are preferable. When the production cost and the corrosion resistance are prioritized, the ordinary precision cast article is preferable. When the mechanical properties such as creep properties are prioritized, the unidirectionally solidified article is preferable.

Based on these technical ideas, the Ni-based superalloy product of the invention has a good balance between the mechanical properties (e.g., creep strength) and the corrosion resistance (including oxidation resistance) at high temperatures, and is superior to conventional cast products in the cost reduction. Therefore, the Ni-based superalloy product of the invention can be suitably used as a turbine high-temperature member used in a high temperature and corrosive environment.

FIG. 1 is a schematic illustration showing a perspective view of a turbine rotor blade as an example of a Ni-based superalloy product according to the invention. As shown in FIG. 1, a turbine rotor blade 100 roughly includes a blade portion 110, a shank portion 120, and a root portion (or dovetail) 130. The shank portion 120 includes a platform 121 and radial fins 122. In the case of a gas turbine for power generation, for example, the size of a turbine rotor blade 100 (length in the longitudinal direction in the figure) is around 10 to 100 cm, and the weight is around 1 to 10 kg.

Figure 2:
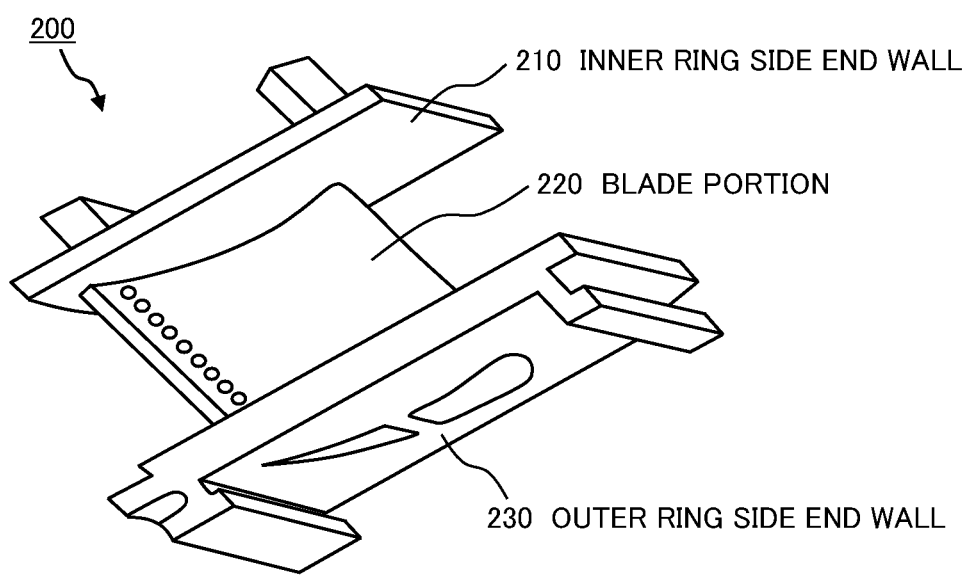
FIG. 2 is a schematic illustration showing a perspective view of a turbine stator blade as another example of a Ni-based superalloy product according to the invention.

FIG. 2 is a schematic illustration showing a perspective view of a turbine stator blade as another example of a Ni-based superalloy product according to the invention. As shown in FIG. 2, the turbine stator blade 200 roughly includes an inner ring side end wall 210, a blade portion 220, and an outer ring side end wall 230. In the case of a gas turbine for power generation, for example, the length of the blade portion 220 of the turbine stator blade 200 (i.e. distance between the end walls 210 and 230) is approximately 170 mm.

EXAMPLES

The present invention will be described in more detail below by way of examples. However, the invention is not limited to the specific examples below.

[Experimental 1]

(Preparation of Inventive Cast Articles ICA-1 to ICA-10 and Conventional Cast Articles CCA-1 to CCA-4)

First, inventive Ni-based superalloys having alloy compositions defined by the invention and conventional Ni-based superalloys having alloy compositions of the prior arts were melted and cast with a refractory crucible and a vacuum induction furnace to form master ingots (80 mm in diameter and of 300 mm in length, respectively). Next, each master ingot was vacuum-melted in an alumina crucible and cast into a ceramic mold heated to 1273 K to prepare a columnar cast article (20 mm in diameter and 150 mm in length, respectively). Then, each columnar cast article was subjected to solution treatment and aging treatment under the conditions shown in Table 1 to produce inventive cast articles ICA-1 to ICA-10 and conventional cast articles CCA-1 to CCA-4.

TABLE 1

Conditions of Solution Treatment and Aging Treatment.

| | | Aging Treatment Condition | | |
| --- | --- | --- | --- | --- |
| Sample No. | Solution Treatment Condition | First Stage Aging Treatment | Second Stage Aging Treatment | Third Stage Aging Treatment |
| ICA-1 to ICA-10 | 1480 K × 2 h Air Cooling | 1363 K × 4 h Air Cooling | 1123 K × 8 h Air Cooling | Not Conducted |
| CCA-1 | 1480 K × 2 h Air Cooling | 1366 K × 4 h Air Cooling | 1325 K × 4 h Air Cooling | 1116 K × 16 h Air Cooling |
| CCA-2 | 1395 K × 2 h Air Cooling | 1116 K × 24 h Air Cooling | Not Conducted | Not Conducted |
| CCA-3 | 1433 K × 2 h Air Cooling | 1116 K × 24 h Air Cooling | Not Conducted | Not Conducted |
| CCA-4 | 1480 K × 2 h Air Cooling | 1366 K × 4 h Air Cooling | 1325 K × 4 h Air Cooling | 1116 K × 16 h Air Cooling |

A test specimen of alloy composition analysis was taken from each of the obtained inventive cast articles ICA-1 to ICA-10 and conventional cast articles CCA-1 to CCA-4, and chemical analysis was performed to quantitatively analyze the alloy compositions. The results are shown in Table 2.

TABLE 2

Chemical Compositions of Inventive Cast Articles ICA-1 to ICA-10 and Conventional Cast Articles CCA-1 to CCA-4 (Quantitative Analysis Results).

Chemical Composition (mass %)

| Sample No. | Ni | Cr | Co | Al | Ti | W | Mo | Nb | Zr | Ta | Hf | Re | B | C | N | O | P | S |
|---|---|---|---|---|---|---|---|---|---|---|---|---|---|---|---|---|---|---|
| ICA-1 | Bal. | 13.8 | 6.8 | 4.0 | 3.3 | 8.0 | 1.8 | 0.01 | 0.005 | 0.04 | 0.001 | 0.005 | 0.015 | 0.09 | 0.001 | 0.004 | 0.003 | 0.005 |
| ICA-2 | Bal. | 13.6 | 6.5 | 4.8 | 3.0 | 8.2 | 1.7 | 0.01 | 0.005 | 0.06 | 0.001 | 0.006 | 0.016 | 0.09 | 0.001 | 0.003 | 0.003 | 0.004 |
| ICA-3 | Bal. | 13.8 | 9.5 | 4.6 | 2.4 | 7.5 | 2.0 | 0.01 | 0.005 | 0.05 | 0.001 | 0.005 | 0.013 | 0.09 | 0.002 | 0.002 | 0.003 | 0.004 |
| ICA-4 | Bal. | 14.0 | 9.8 | 4.0 | 2.8 | 7.0 | 2.2 | 0.01 | 0.005 | 0.05 | 0.001 | 0.003 | 0.018 | 0.05 | 0.002 | 0.002 | 0.004 | 0.001 |
| ICA-5 | Bal. | 13.8 | 10.0 | 4.6 | 2.4 | 6.8 | 1.8 | 0.01 | 0.005 | 0.04 | 0.001 | 0.006 | 0.012 | 0.07 | 0.003 | 0.003 | 0.003 | 0.002 |
| ICA-6 | Bal. | 13.6 | 10.5 | 3.8 | 2.4 | 6.5 | 2.4 | 0.01 | 0.005 | 0.03 | 0.001 | 0.002 | 0.015 | 0.07 | 0.001 | 0.003 | 0.003 | 0.002 |
| ICA-7 | Bal. | 13.8 | 10.0 | 4.2 | 3.3 | 6.0 | 2.0 | 0.01 | 0.005 | 0.05 | 0.001 | 0.003 | 0.013 | 0.09 | 0.002 | 0.004 | 0.004 | 0.005 |
| ICA-8 | Bal. | 14.0 | 12.0 | 4.0 | 3.2 | 5.5 | 2.2 | 0.01 | 0.005 | 0.06 | 0.001 | 0.004 | 0.011 | 0.07 | 0.002 | 0.003 | 0.003 | 0.003 |
| ICA-9 | Bal. | 13.8 | 10.0 | 4.2 | 3.3 | 6.0 | 2.0 | 0.4 | 0.005 | 0.04 | 0.001 | 0.005 | 0.012 | 0.09 | 0.002 | 0.004 | 0.004 | 0.002 |
| ICA-10 | Bal. | 13.8 | 10.0 | 4.2 | 3.3 | 6.0 | 2.0 | 0.8 | 0.005 | 0.08 | 0.001 | 0.005 | 0.013 | 0.09 | 0.001 | 0.004 | 0.002 | 0.002 |
| CCA-1 | Bal. | 14.1 | 9.2 | 3.0 | 5.0 | 3.9 | 4.0 | 0.01 | 0.005 | 0.04 | 0.005 | 0.006 | 0.015 | 0.17 | 0.001 | 0.003 | 0.004 | 0.005 |
| CCA-2 | Bal. | 14.2 | 10.1 | 3.0 | 4.8 | 3.8 | 1.1 | 0.01 | 0.04 | 2.2 | 0.52 | 0.008 | 0.010 | 0.12 | 0.001 | 0.002 | 0.004 | 0.004 |
| CCA-3 | Bal. | 13.2 | 10.1 | 4.0 | 2.7 | 4.3 | 1.5 | 0.01 | 0.05 | 4.7 | 0.01 | 0.007 | 0.015 | 0.10 | 0.002 | 0.003 | 0.004 | 0.005 |
| CCA-4 | Bal. | 13.9 | 6.6 | 4.0 | 3.3 | 4.0 | 1.9 | 1.1 | 0.01 | 2.8 | 0.05 | 0.002 | 0.016 | 0.13 | 0.002 | 0.002 | 0.004 | 0.003 |

In Table 2, "Bal." of the Ni component includes impurities other than the components listed in the table. Incidentally, the conventional cast article CCA-1 is a Ni-based alloy cast article prepared by referring to Japanese Patent Publication No. Shou 46 (1971)-27144; the conventional cast article CCA-2 is a Ni-based alloy prepared by referring to JP Shou 51 (1976)-34819 A; the conventional cast article CCA-3 is a Ni-based alloy cast article prepared by referring to JP Hei 6 (1994)-57359 A; and the conventional cast article CCA-4 is a Ni-based alloy cast article prepared by referring to JP 2004-197131 A.

As shown in Table 2, the inventive cast articles ICA-1 to ICA-10 do not intentionally contain Ta, Hf and Re, and have a balance among W, Mo and Ti contents different from those of the conventional cast articles CCA-1 to CCA-4.

[Experimental 2]

(Investigation and Evaluation of ICA-1 to ICA-10 and CCA-1 to CCA-4)

(1) Evaluation of Mechanical Properties

ICA-1 to ICA-10 and CCA-1 to CCA-4 produced in Experimental 1 were machined to prepare creep test specimens (6 mm in parallel part diameter and 30 mm in length, respectively). Then, each creep test specimen was subjected a creep test (1255 K and 138 MPa) to measure the creep rupture time.

Creep rupture time of 150 hours or more was judged as "passed", and creep rupture time of less than 150 hours was judged as "failed". The results are shown in Table 3 described later.

(2) Evaluation of Corrosion Resistance Properties

ICA-1 to ICA-10 and CCA-1 to CCA-4 produced in Experimental 1 were machined to prepare oxidation test specimens (10 mm in width, 25 mm in length and 1.5 mm in thickness, respectively). Then, each oxidation test specimen was subjected to a high temperature repeated oxidation test (in air, kept at 1373 K for 20 hours, repeated 12 times), and there was measured amount of mass change per unit surface area ($mg/cm^2$) of each of the oxidation test specimens. It means that the smaller the mass change amount (the smaller absolute value of the negative number), the higher the oxidation resistance.

A mass change of −15 $mg/cm^2$ or less (weight loss of 15 $mg/cm^2$ or less) was judged as "passed", and a mass change of more than −15 $mg/cm^2$ (weight loss of more than 15 $mg/cm^2$) was judged as "failed". The results are also shown in Table 3.

(3) Evaluation of Molten Salt Corrosion Resistance

ICA-1 to ICA-10 and CCA-1 to CCA-4 produced in Experimental 1 were machined to prepare corrosion test specimens (cube of 14 mm in side). Then, each corrosion test specimen was subjected to a molten salt immersion test (immersion in a mixed molten salt of "NaCl:$Na_2SO4$=1 mol:3 mol" and held at 1133 K for 50 hours), and there was measured amount of mass change per unit surface area ($mg/cm^2$) of each of the corrosion test specimens. It means that the smaller the mass change amount (the smaller the absolute value of the negative number), the higher the molten salt corrosion resistance.

A mass change of −10 $mg/cm^2$ or less (weight loss of 10 $mg/cm^2$ or less) was judged as "passed", and a mass change of more than −10 $mg/cm^2$ (weight loss of more than 10 $mg/cm^2$) was judged as "failed". The results are also shown in Table 3.

TABLE 3

Investigation and Evaluation Results of Mechanical Property and Corrosion Resistance.

| Sample No. | Mechanical Property Creep Rupture Time (h) | | Corrosion Resistance | | | |
|---|---|---|---|---|---|---|
| | | | Oxidation Resistance (mg/cm$^2$) | | Molten Salt Corrosion Resistance (mg/cm$^2$) | |
| ICA-1 | 181 | Passed | −10.2 | Passed | −2.4 | Passed |
| ICA-2 | 193 | | −11.4 | | −1.4 | |
| ICA-3 | 165 | | −11.7 | | −3.5 | |
| ICA-4 | 176 | | −8.2 | | −7.0 | |
| ICA-5 | 183 | | −12.5 | | −5.6 | |
| ICA-6 | 173 | | −9.7 | | −4.6 | |
| ICA-7 | 187 | | −10.8 | | −3.2 | |
| ICA-8 | 156 | | −9.1 | | −4.9 | |
| ICA-9 | 192 | | −10.4 | | −4.9 | |
| ICA-10 | 186 | | −8.5 | | −5.7 | |
| CCA-1 | 180 | Passed | −141 | Failed | −74.9 | Failed |
| CCA-2 | 117 | Failed | −33.5 | Failed | −3.9 | Passed |
| CCA-3 | 256 | Passed | −7.2 | Passed | −16.8 | Failed |
| CCA-4 | 190 | Passed | −10.5 | Passed | −37.8 | Failed |

As shown in Table 3, the conventional cast article CCA-1 is judged as "passed" in the mechanical properties, but has a large defect in the oxidation resistance and the molten salt corrosion resistance (i.e., the corrosion resistance). The conventional cast article CCA-2 exhibits good molten salt corrosion resistance, but is judged as "failed" in the mechanical properties and the oxidation resistance. The conventional cast article CCA-3 exhibits good mechanical properties and good oxidation resistance, but is judged as "failed" in the molten salt corrosion resistance. The conventional cast article CCA-4 is judged as "passed" in the mechanical properties and the oxidation resistance, but is judged as "failed" in the molten salt corrosion resistance.

In contrast to the conventional cast articles, it can be seen that the inventive cast articles ICA-1 to ICA-10 are evaluated "passed" in all of the mechanical properties, the oxidation resistance and the molten salt corrosion resistance. In other words, it is confirmed that the cast articles of the invention have a balance with a high level in the mechanical properties, the oxidation resistance and the molten salt corrosion resistance, as compared with the conventional cast articles. In addition, because the cast articles of the invention do not contain expensive elements (such as Ta, Hf and Re) as described before, the cost can be reduced as compared with the conventional cast articles.

[Experimental 3]

(Preparation, Investigation and Evaluation of Unidirectionally Solidified Article)

Using the same master ingot as the inventive cast article ICA-1 described above, a plate cast article (100 mm in width, 200 mm in length, and 15 mm in thickness) was prepared by unidirectional solidification casting. The length direction thereof was the solidification direction. Then, the plate cast article was subjected to the solution treatment and the aging treatment similar to those in Experimental 1 to fabricate the inventive cast article ICA-1-2.

Next, the inventive cast article ICA-1-2 was subjected to the creep test, the high temperature cyclic oxidation test and the molten salt immersion test similar to those in Experimental 2 to evaluate the mechanical properties, oxidation resistance and molten salt corrosion resistance. As a result, it was confirmed that the creep strength was significantly improved as compared with ICA-1 while maintaining the same oxidation resistance and the same molten salt corrosion resistance as the inventive cast article ICA-1.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

LEGEND

100 . . . Turbine Rotor Blade;
110 . . . Blade Portion;
120 . . . Shank Portion;
121 . . . Platform;
122 . . . Radial Fin;
130 . . . Root Portion;
200 . . . Turbine Stator Blade;
210 . . . Inner Ring Side End Wall;
220 . . . Blade Portion; and
230 . . . Outer Ring Side End Wall.

The invention claimed is:

1. A Ni-based superalloy cast article having a chemical composition comprising:
12.1 mass % or more and 16 mass % or less of Cr;
4 mass % or more and 16 mass % or less of Co;
3 mass % or more and 5 mass % or less of Al;
2.1 mass % or more and 3.3 mass % or less of Ti;
3.5 mass % or more and 9 mass % or less of W;
1 mass % or more and 2.4 mass % or less of Mo;
1.2 mass % or less of Nb;
0.005 mass % or more and 0.05 mass % or less of B;
0.03 mass % or more and 0.2 mass % or less of C;
more than 0 mass % and 0.005 mass % or less of O; and
the balance being Ni and impurities, wherein the impurities comprises:
0.1 mass % or less of Ta,
0.05 mass % or less of Hf,
0.05 mass % or less of Re,
0.05 mass % or less of Zr,
0.005 mass % or less of N,
0.01 mass % or less of P, and
0.01 mass % or less of S.

2. The Ni-based superalloy cast article according to claim 1, wherein the chemical composition comprises:
the Cr of 13.1 mass % or more and 16 mass % or less;
the Co of 5.1 mass % or more and 15 mass % or less;
the Al of 3.6 mass % or more and 5 mass % or less;
the Ti of 2.2 mass % or more and 3.3 mass % or less;
the W of 4.5 mass % or more and 9 mass % or less;
the Mo of 1.4 mass % or more and 2.4 mass % or less;
the Nb of 0.5 mass % or less;
the B of 0.01 mass % or more and 0.03 mass % or less;
the C of 0.05 mass % or more and 0.15 mass % or less; and
the O of 0.001 mass % or more and 0.005 mass % or less.

3. The Ni-based superalloy cast article according to claim 1, wherein the chemical composition comprises:
the Cr of 13.1 mass % or more and 14.5 mass % or less;
the Co of 6 mass % or more and 12 mass % or less;
the Al of 3.8 mass % or more and 4.8 mass % or less;
the Ti of 2.3 mass % or more and 3.3 mass % or less;
the W of 5 mass % or more and 9 mass % or less;
the Mo of 1.8 mass % or more and 2.4 mass % or less;
the Nb of 0.1 mass % or less;
the B of 0.01 mass % or more and 0.02 mass % or less;
the C of 0.05 mass % or more and 0.12 mass % or less; and
the O of 0.001 mass % or more and 0.004 mass % or less.

4. A Ni-based superalloy product, using the Ni-based superalloy cast article according to claim 1, wherein the cast article has a metallographic structure composed of equiaxed crystals or composed of columnar crystals aligned in the long axis direction.

5. The Ni-based superalloy product according to claim 4, wherein the product is a turbine member.

6. The Ni-based superalloy product according to claim 5, wherein the turbine member is a turbine blade.

* * * * *